United States Patent Office 3,078,937
Patented Feb. 26, 1963

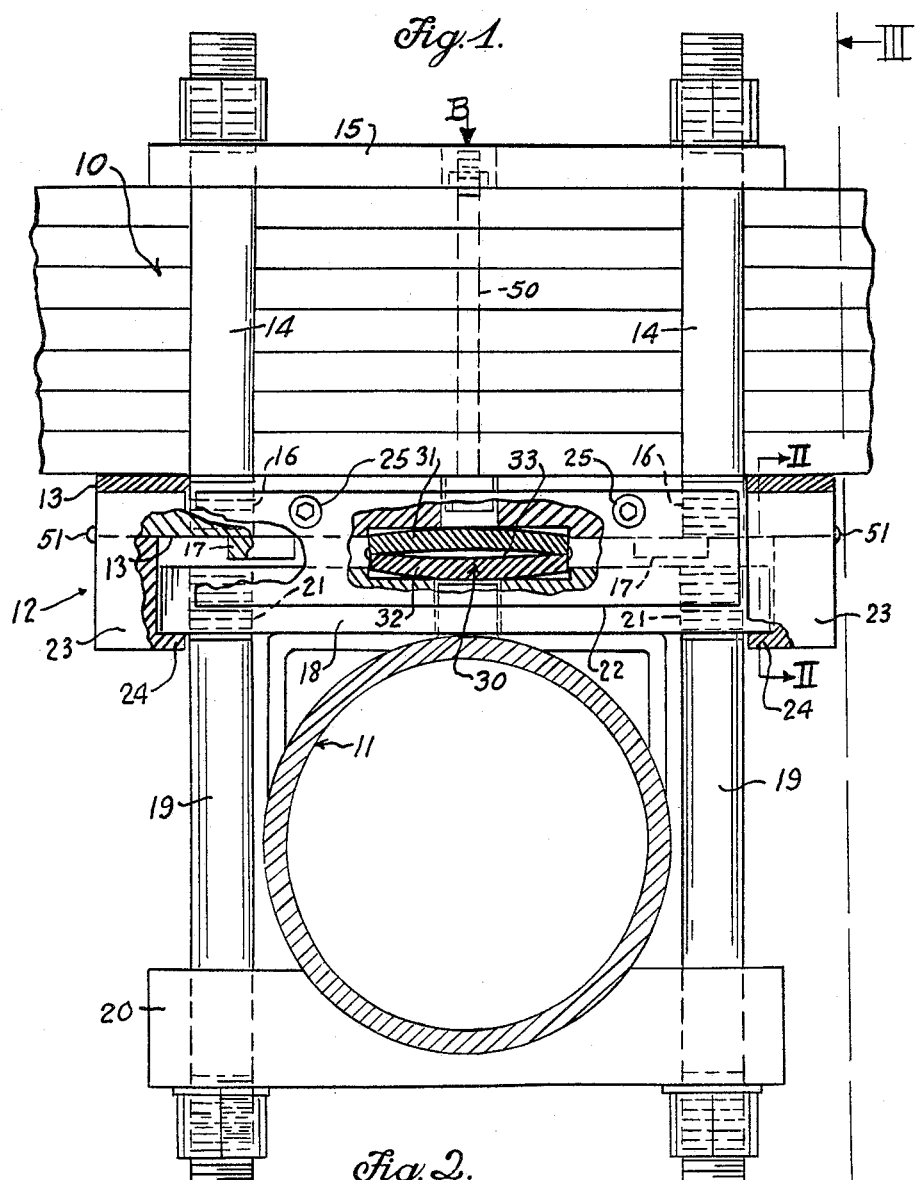

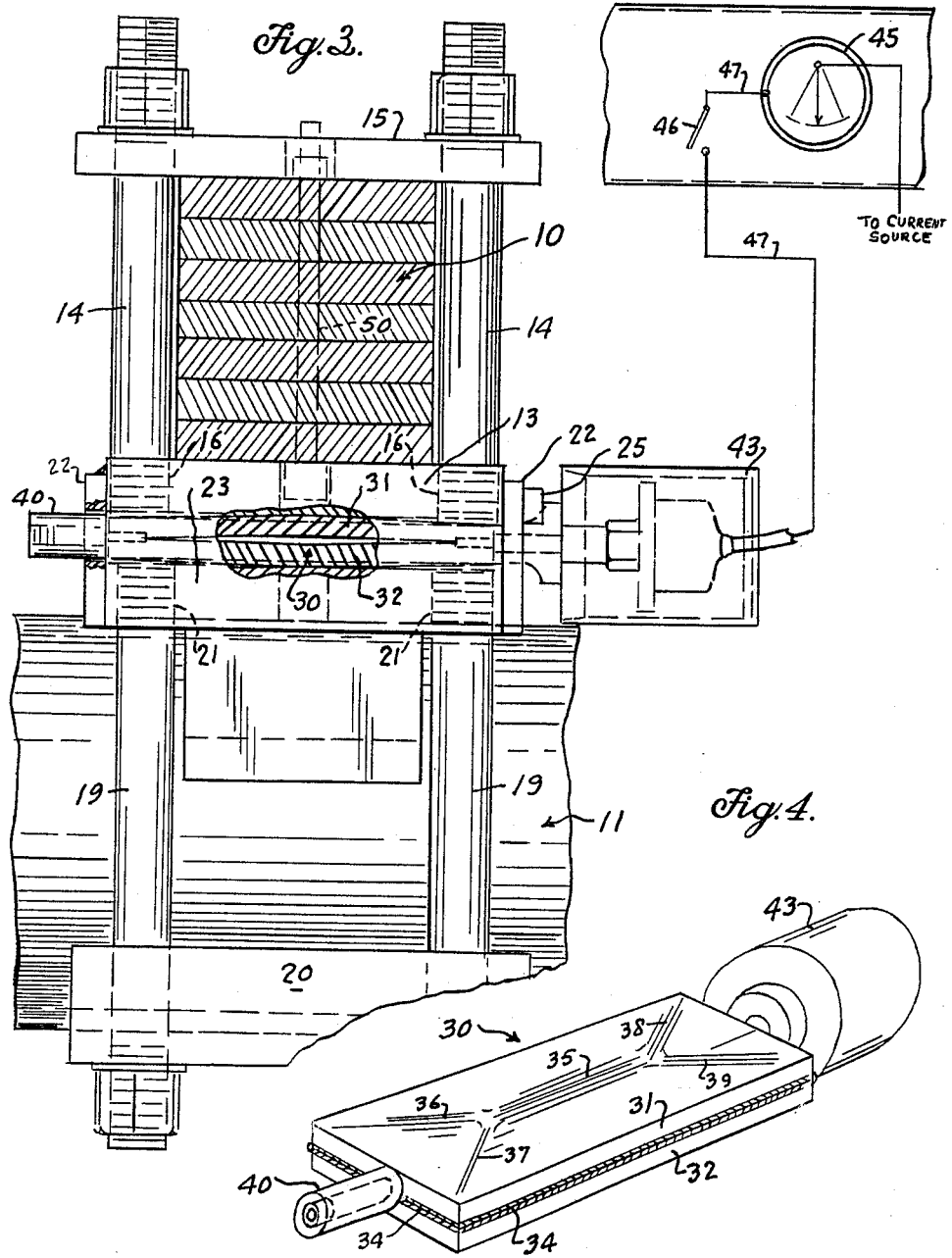

3,078,937
VEHICLE SCALE AND ASSEMBLY
Alvin L. Mehki, La Salle, Mich., and Lorence Rodenbeck, Kunkle, Ohio, assignors to Russell J. Mehki, Raymond G. Mehki, Alvin L. Mehki, Fred D. Mehki, Lorence Rodenbeck, Donald Rodenbeck, and Richard C. Elconin, jointly
Filed Sept. 24, 1958, Ser. No. 763,087
3 Claims. (Cl. 177—141)

This invention relates to a vehicle weighing scale and a remote indicator thereof for example, on the dash of the vehicle and has for its object the provision of a specially constructed hydraulic unit arranged to flex sufficiently to indicate the weight and to carry the load through from the spring to the axle, arranged to operate so as to avoid fracturing or disruption of the unit.

Another object is an arrangement of unit and supporting means whereby the unit can be readily inserted or removed.

Another object is to provide a hydraulic weighing unit and a relatively movable two part housing assembly or supporting means which is extremely strong and is interposed between the spring and the axle to transmit heavy loads therethrough with said unit incorporated therein, so as to transmit the entire weight of the vehicle in order to give a correct weighing indication through a suitable pressure gauge.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

FIGURE I is an elevation partly in section showing the application of the invention to a truck;

FIGURE II is a section on the line II—II of FIGURE I;

FIGURE III is a sectional elevation taken substantially on the line III—III of FIGURE I; and FIGURE IV is a perspective view of the pressure responsive element.

In FIGURE I, we show a spring 10 and axle 11 between which is a hydraulic weighing unit enclosing or supporting housing 12, said housing comprised of an upper rigid solid relatively thick flanged plate 13, bolted by two pairs of bolts 14 connected as shown to spring 10, through plate 15 and tapped into plate 13 as indicated at 16. Stops 17 are provided, positioned as shown, to limit movement of parts of housing 12. The lower plate 18 of the housing 12 is free from plate 13 but is bolted by bolts 19 to the axle 11 as shown, a cradle or bottom plate 20 facilitating the connection of plate 18 to axle 11. The upper end of bolts 19 are tapped as at 21 to plate 18.

We provide depending flanges on the upper plate 13 to completely surround lower plate 18 and are indicated at 23 for the sides of the housing 12 and at 22 from the ends thereof. These side flanges 23 have inwardly turned lips or extensions 24 extending under plate 18 to prevent separation of plates 13 and 18, it being understood that plate 18 may move upwardly toward plate 13 in use on the vehicle.

One of the end flanges 22 is removable, being held to plate 13 by removable screw 25 so that the hydraulic weighing unit, indicated at 30, shown separately in FIGURE IV, may be inserted or removed from housing 12.

The hydraulic unit 30, in the present embodiment thereof, is illustrated in section in FIGURE I and in detached perspective in FIGURE IV, consists of an upper plate 31 and a lower plate 32, hollowed or formed to present a more or less convex character and connected face to face, as shown in FIGURE I, so as to form the cavity 33, being the receptacle for the oil or other fluid, to form the hydraulic weight measuring means. An important feature of our present invention resides in the fact that these two plates 31 and 32 are substantially identical and, being positioned substantially as shown and connected thereto on their meeting peripheries, as indicated at 34 by a welding process, for example. As indicated in FIGURE IV, these plates in one embodiment of our invention are formed by forming the ridges indicated in FIGURE IV at 35, 36, 37, 38 and 39, although of course these plates could be formed in a rounded configuration, presenting thereby a smooth outside surface. The feature of our invention of having these plates meet at the meeting peripheries as shown, is that upon stress and force being applied therethrough the entire unit 30 will bend as a unit, generally speaking, and there is practically no tendency of these two plates to disrupt the weld around the meeting edges at the periphery thereof.

An inlet oil fitting pipe 40 is shown at one end of the unit 30, and this device may also provide means whereby the oil is not only fed into the hollow chamber of the unit 30 but can be put under a pre-stressed amount of pressure and sealed. On the other end of the unit 30, we provide a combined hydraulic and electrical unit pressure gauge 43, which may be of any well known hydraulic type having electrical connections therewith and is illustrated in FIGURES III and IV. Referring to FIGURE III it will be seen that we have an electrical connection from the gauge 43 to an indicating gauge 45 on the dash of the vehicle, a switch 46 being in the line 47 between the electrical indicating scale 45.

From the foregoing, it will be seen that the unit 30, being enclosed in the housing 12, formed primarily by the upper plate 13 and the lower plate 18, may be readily inserted and removed, since it is positioned in the space indicated at A in FIGURE II for receiving said unit 30. To this end, the housing 12, as stated supra, has an end plate 22 which is removable therefrom, by reason of the bolts on set screws 25, since this extension or inlet pipe 40 is no thicker than the unit 30, and therefore it can be slid into the gauge on end wall 22.

A further important feature of our invention is that the housing 12, itself, is not rigidly connected together, but the upper part 13 is bolted by bolts 14 to the spring 10, while the other heavy plate 18, forming the lower part is bolted by bolts 19 around the axle 11, as shown particularly in FIGURE I. In use these two plates may freely slide toward and away from each other, the flanges or surrounding border of the housing confining the same in proper position. To this end, the projection 17 forms the limiting stops for preventing the plates from moving too closely together, while the turned in lips 24 on the side flanges 23 (which depend from the upper plate 13) engage underneath the lower surface of the lower plate 18 and prevent plates 13 and 18 from moving away too far.

The particular housing construction described has a further important feature of permitting the upper part of the unit to be held by the spring 10, wholly separately from the connection of the lower plate 18 connected by bolts 19 to the axle 11.

It will be noted that we also provide a bolt 50 passing through the springs as a tie means for the springs themselves and the assembly, the bolt 50 being properly anchored on the front and lower ridges of the spring.

It will be understood from the foregoing, it is believed, how the device may be properly assembled on a vehicle such as a truck, and in this connection for facilitating such an assembly particularly of the housing 12, the end plates 22, which have the in-turned bottom flanges or lips 24 are made separately from the upper plate 13 and welded thereto, as indicated at 51.

Operation

In use, it will be seen that the weight of the truck passing downwardly as indicated by the arrow B in FIGURE I, passes through the springs, upper plate 13, through the unit 30, including the hydraulic fluid contained therein, through the lower plate 18, to the axle 11. We have found that a relatively small amount of oil is sufficient to transmit very large weights and is particularly adapted for use with the combined hydraulic and electric gauge and pressure indicating means 43.

If it be desired to determine the total weight including the truck, contents, and axle transmitted to the road, and since the weight of the axle and the truck, itself, unloaded, may be ascertained, the gauge 45 may be scaled with these weights indicated therein, and as a load is applied to the truck, the oil in the scale 45 will indicate the total weight transmitted to the roadway. On the other hand, if desired, the scale on the gauge 45 may be arranged so as to indicate merely the added load applied into the vehicle when in use.

It is apparent that, within the scope of the invention, modifications and different arrangements may be made other than is herein disclosed, and the present disclosure is illustrative merely, the invention comprehending all variations thereof.

What we claim is:

1. In a weight measuring assembly for motor vehicles connected between a vehicle spring and a transverse axle of the vehicle in the line of transmission of the load weight of the vehicle to said axle, said assembly including a hydraulic measuring capsule and a housing completely surrounding said capsule, said capsule comprised of a pair of bowed opposed flexible metal plates spaced apart and joined at their edges adapted to receive a guage actuating fluid; said housing including a pair of spaced rigid transversely arranged plates one above and the other below said capsule, said plates arranged to bodily move vertically toward and away from each other, the upper plate bolted to the vehicle spring and the lower plate bolted to said axle, one of said plates having vertical flanges on the sides and ends thereof to contact the edges of the other plate and prevent transverse movement of one plate relative to the other, said end flanges having inturned lips extending transversely and adapted to contact the face of the other plate to limit the upward separation of said upper and lower plates, stop means fixed to one of the opposed plates and arranged in spaced relation to the other of said normally separated upper and lower plates while said capsule is in normally expanded weighing position, said stop means contacting the other housing plate when said capsule has been compressed by the load weight in the vehicle to limit the vertical movement of said upper and lower plates toward each other, fluid connecting means on opposite ends of said capsule, certain of said housing flange plates having openings therein for receiving said fluid connecting means of said capsule to support and carry and locate said capsule centrally in said housing; and a weight measuring guage connected to said capsule.

2. In a weight measuring assembly for motor vehicles connected between a vehicle spring and a transverse axle of the vehicle in the line of transmission of the load weight of the vehicle to said axle, said assembly including a hydraulic measuring capsule and a surrounding housing therefor, said capsule comprised of a pair of bowed opposed spring metal rectangular shaped plates spaced apart and joined at their edges, said plates having reinforcing ridges provided on the external surface thereof, the longitudinal axis of said capsule extending transversely of the vehicle above said axle; said housing including a pair of spaced rectangularly shaped relatively moveable plates, one above and the other below said capsule with the upper plate bolted to the vehicle spring and the lower plate bolted to said axle, said upper plate having depending flanges on the sides and ends thereof, each of said side flanges having inturned lips extending underneath and along the lower face of the lower plate to contact the same and limit the upward separation of said upper and lower plates; stops on the lower face of the upper plate arranged to contact the upper face of the lower plate to limit the movement of said upper and lower plates toward each other; end plates secured to the ends of the upper housing plate slidable over the ends of the lower plate; fluid connecting means on opposite ends of said capsule communicating with the interior of said capsule; said housing end plates having openings therein for receiving said capsule connecting means thereto to support and carry and locate said capsule centrally in said housing; and a weight measuring guage connected to said capsule connecting means.

3. In a weight measuring assembly as set forth in claim 2 wherein said weight measuring guage is disposed above said axle.

References Cited in the file of this patent

UNITED STATES PATENTS

| 2,613,925 | Weber | Oct. 14, 1952 |
| 2,867,432 | Barker et al. | Jan. 6, 1959 |

FOREIGN PATENTS

| 108,605 | Sweden | Sept. 28, 1943 |